July 7, 1953   L. E. OBERHOLTZ   2,644,287
DETACHABLY MOUNTED COUNTERBALANCED WINDROWER
Filed Dec. 15, 1948   7 Sheets-Sheet 1

Inventor
LESTER E. OBERHOLTZ
By Fishburn & Mullendore
Attorneys

July 7, 1953 L. E. OBERHOLTZ 2,644,287
DETACHABLY MOUNTED COUNTERBALANCED WINDROWER
Filed Dec. 15, 1948 7 Sheets-Sheet 3

Inventor
LESTER E. OBERHOLTZ
By Fishburn & Mullendore
Attorneys

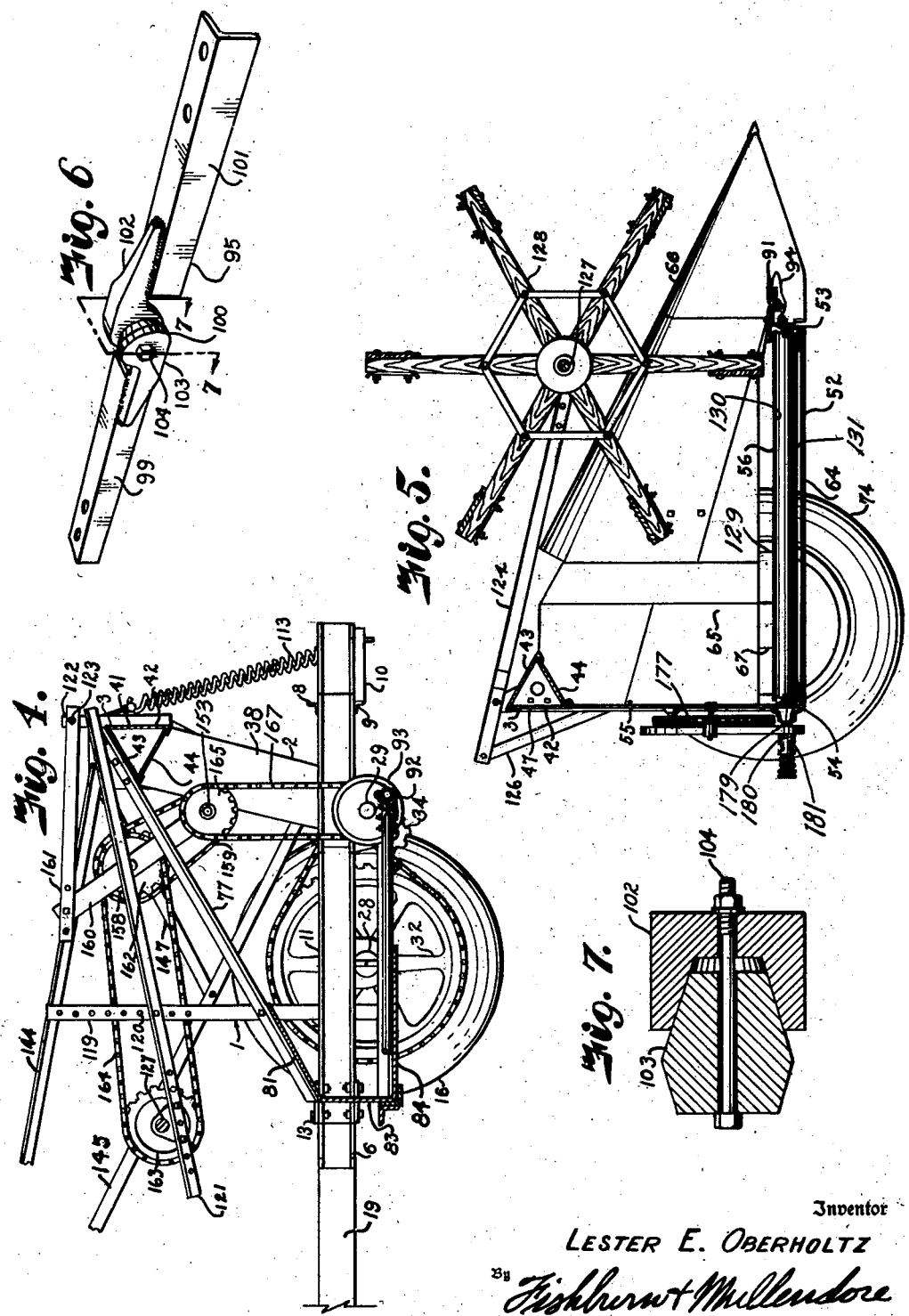

July 7, 1953

L. E. OBERHOLTZ 2,644,287

DETACHABLY MOUNTED COUNTERBALANCED WINDROWER

Filed Dec. 15, 1948

Inventor
LESTER E. OBERHOLTZ
By Fishburn & Mullendore
Attorneys

July 7, 1953
L. E. OBERHOLTZ
2,644,287
DETACHABLY MOUNTED COUNTERBALANCED WINDROWER
Filed Dec. 15, 1948
7 Sheets-Sheet 6
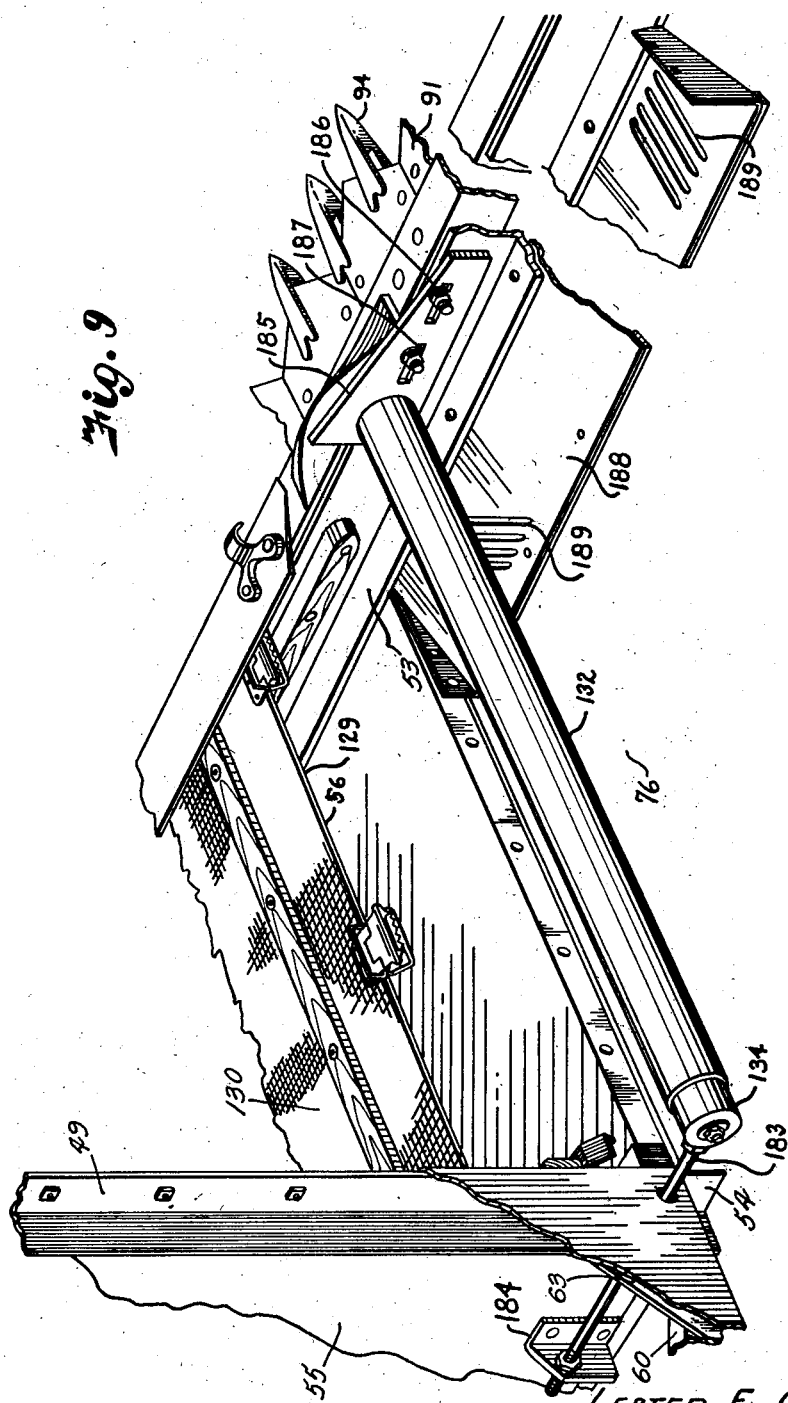
Inventor
LESTER E. OBERHOLTZ
By Fishburn & Mullendore
Attorneys July 7, 1953 L. E. OBERHOLTZ 2,644,287
DETACHABLY MOUNTED COUNTERBALANCED WINDROWER
Filed Dec. 15, 1948 7 Sheets-Sheet 7
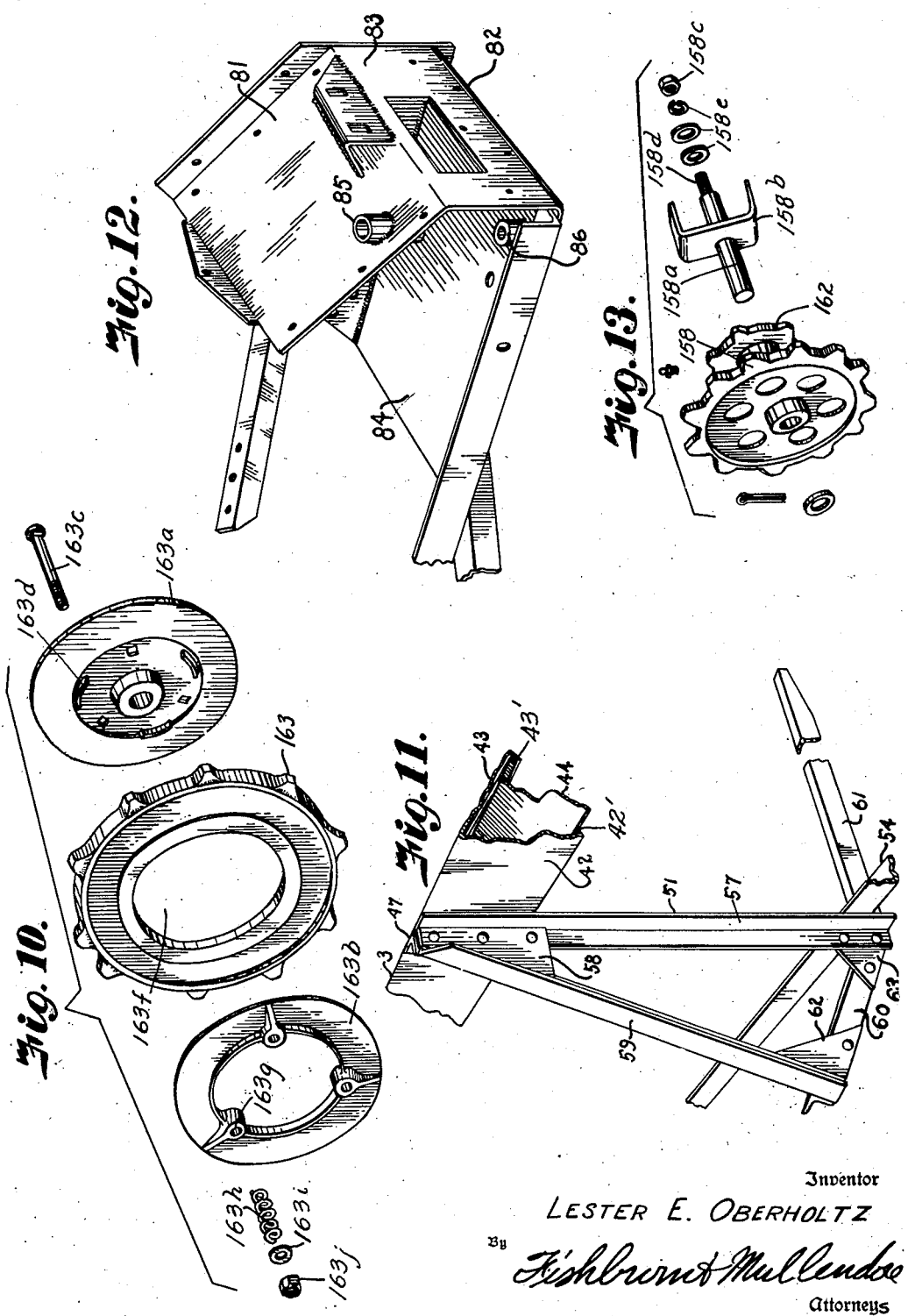
Inventor
LESTER E. OBERHOLTZ
By Fishburn & Mullendore
Attorneys Patented July 7, 1953

2,644,287

UNITED STATES PATENT OFFICE 2,644,287

DETACHABLY MOUNTED COUNTERBALANCED WINDROWER

Lester E. Oberholtz, Independence, Mo., assignor to Gleaner Harvester Corporation, Independence, Mo., a corporation of Delaware Application December 15, 1948, Serial No. 65,307

8 Claims. (Cl. 56—192)

This invention relates to windrowers for cutting and depositing crops in windrows preparatory to curing and subsequent processing operations and has for its principal object to provide a machine of this character having a strong, lightweight construction with the weight balanced on the main wheel to promote traction and facilitate mobility in response to the draft vehicle by which the machine is propelled.

Other objects of the invention are to provide an arrangement of the supporting wheels and automatic control of the draper so as to avoid operation of the machine over windows when turning corners of a field; to provide ready adaptation of the machine for light and heavy crops; to provide for pivoting the harvester section of the frame on the main frame independently of the support of the main frame for adjusting the cutting height of the sickle; to provide the machine with driving connections which do not require belt tighteners; to provide a frame structure which eliminates twisting in the harvester frame section because of side draft; to provide a frame construction which faciiltates assembly and disconnection of the harvester section from the main frame; to provide the machine with a stubble shield which is automatically kept clear of cut grain by action of the stubble; and to provide the machine with an adjustable draft tongue to control the side draft.

In accomplishing these and other objects of the invention, I have provided improved structure, the preferred form of which is illustrated in the accompanying drawings wherein:

Fig. 4 is a longitudinal section through the machine on the line 4—4 of Fig. 1.

Fig. 5 is a similar section on the line 5—5 of Fig. 1.

Fig. 6 is a detail perspective view of the main diagonal brace.

Fig. 7 is an enlarged cross section through the joint of the main diagonal brace on the line 7—7 of Fig. 6.

Fig. 9 is an enlarged fragmentary view of the discharge end of the draper and particularly illustrating the stubble shield.

Fig. 10 is an enlarged perspective view of the reel sprocket shown in disassembled spaced relation.

Fig. 11 is an enlarged fragmentary perspective view of a portion of the harvesting frame.

Fig. 12 is an enlarged perspective view of the sickle drive housing.

Fig. 13 is an enlarged perspective view of the parts of the reel driving sprocket shown in disassembled spaced relation.

Referring more in detail to the drawings:

1 designates a windrower constructed in accordance with the present invention and which includes a main frame 2 and a lateral harvester frame 3 extending substantially at right angles to the line of draft and which ordinarily creates a considerable structural problem because of side draft but which in the present instance is rigidly supported by a lateral truss 4.

Figure 1:
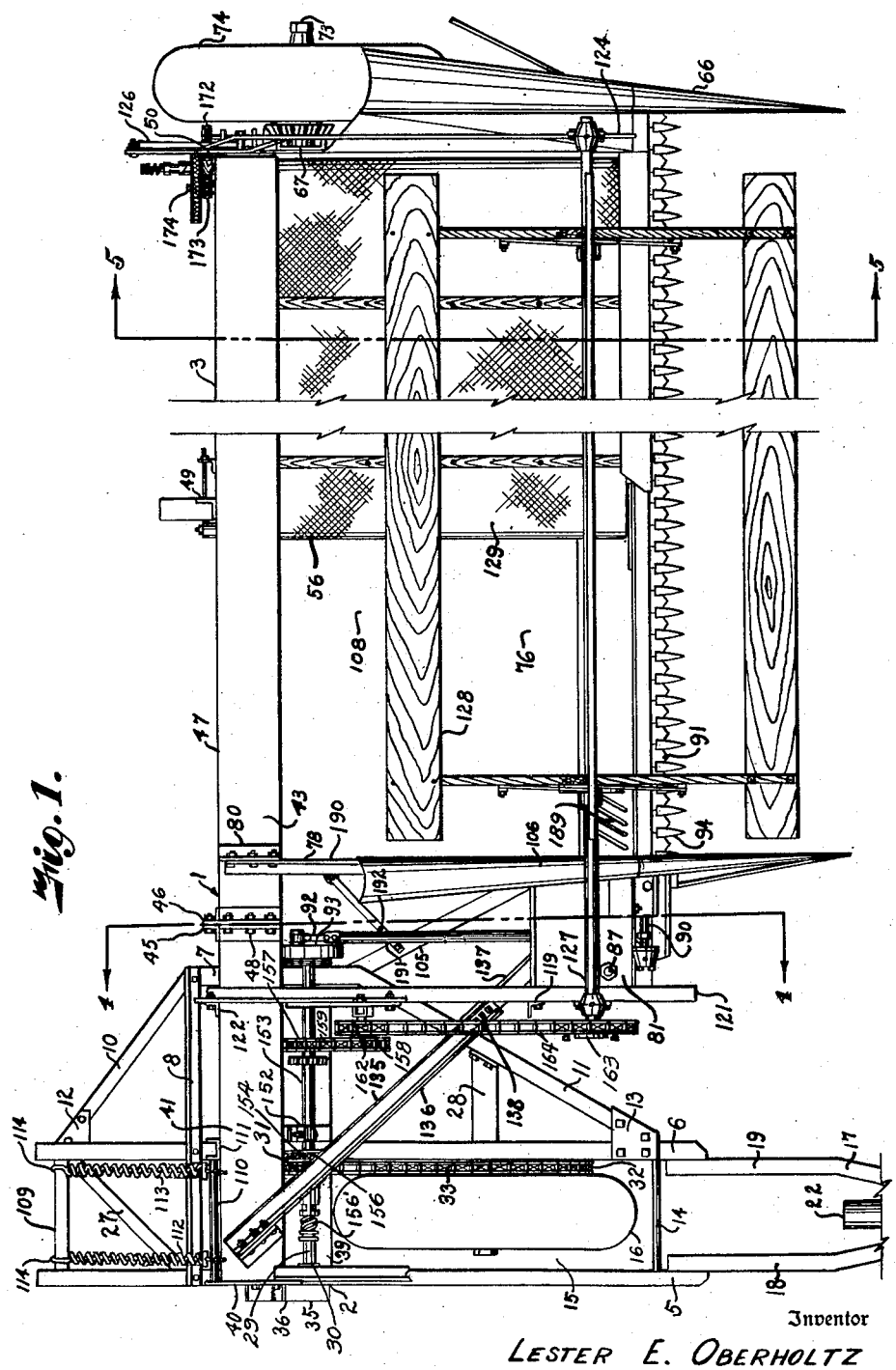
Fig. 1 is a plan view of a windrowing machine embodying the features of the present invention with portions of the machine broken away to shorten the figure and to better illustrate other parts of the machine.
Figure 2:
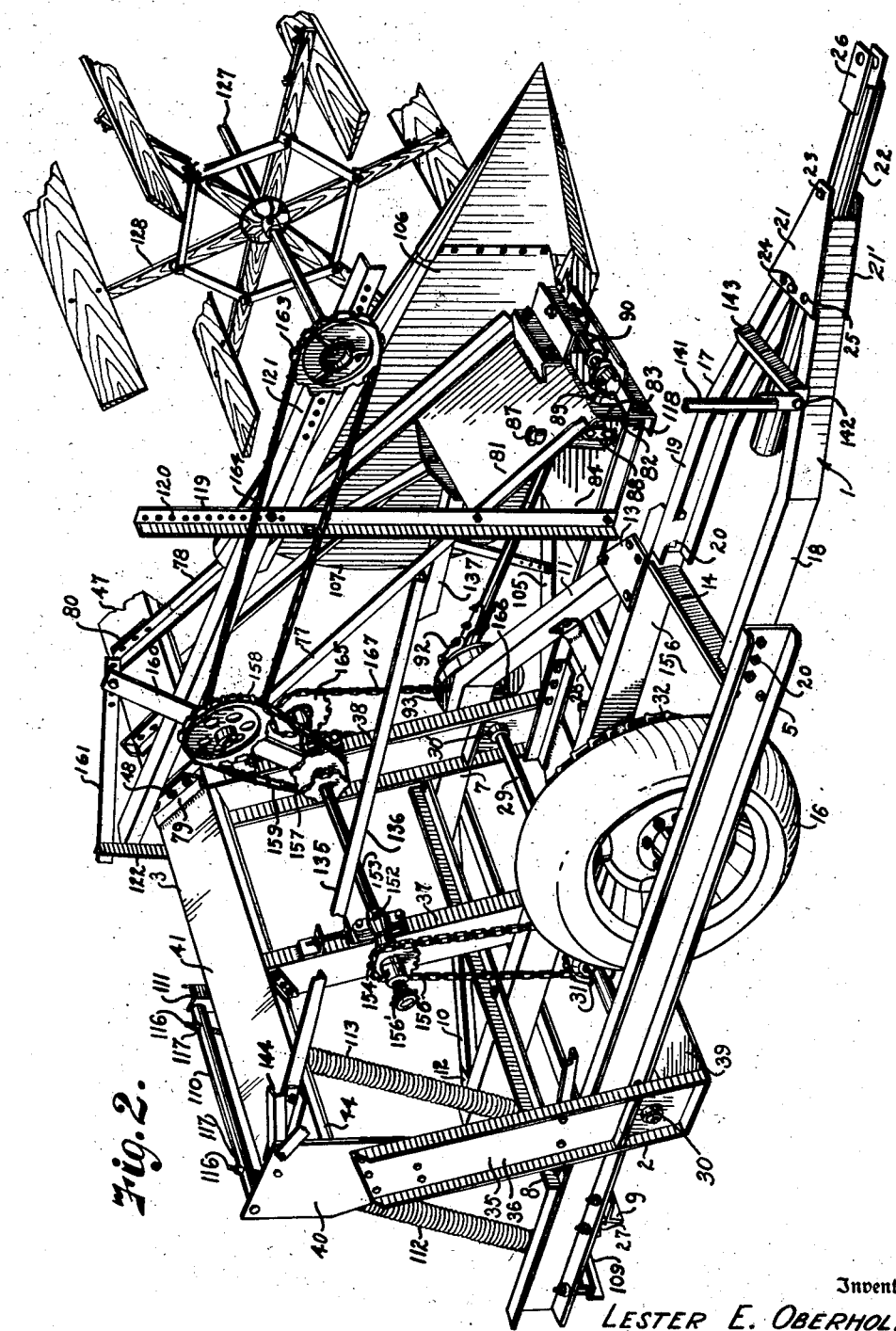
Fig. 2 is a perspective view of the main wheel side of the machine with parts broken away to better illustrate parts that obscure other parts.

The main frame 2 includes laterally spaced longitudinal sills 5 and 6 and a relatively shorter sill 7 that are connected in spaced relation by upper and lower cross members 8 and 9. The sill 7 is connected at its ends with the corresponding ends of the longitudinal sill 6 by diagonals 10 and 11. The diagonals 10 and 11 are preferably welded to the ends of the shorter sill 7 and are secured to the longitudinal sill 6 by gusset plates 12 and 13 as best shown in Figs. 1 and 2. The longitudinal sills 5 and 6 are interconnected at their forward ends and by a spacer 14 which cooperates with the cross members 8 and 9 in maintaining parallel relationship of the sills to provide a wheel pocket 15 in which the main wheel 16 is mounted.

The forward ends of the longitudinal sills 5 and 6 are connected with a hitch frame 17 comprising spaced members 18 and 19 connected at the ends of the longitudinal sills 5 and 6 by fastening devices such as bolts 20. The forward ends of the members 18 and 19 converge and are connected by gusset plates 21 and 21' to accommodate a tongue 22 therebetween. The tongue 22 is pivotally connected with the gusset plates 21 and 21' by a bolt or pin 23 that extends through the gusset plates and tongue as best shown in Fig. 2 and on which the tongue is pivotally mounted for adjustment relatively to the main hitch frame 17 so as to compensate for side draft produced by the harvester section. The tongue is retained in adjusted position by a bolt or the like 24 that extends therethrough and one of a series of laterally spaced openings 25 in the rear ends of the gusset plate. The forward end of the tongue is provided with a clevis 26 which is adapted to be connected to the drawbar of a tractor (not shown).

Figure 8:
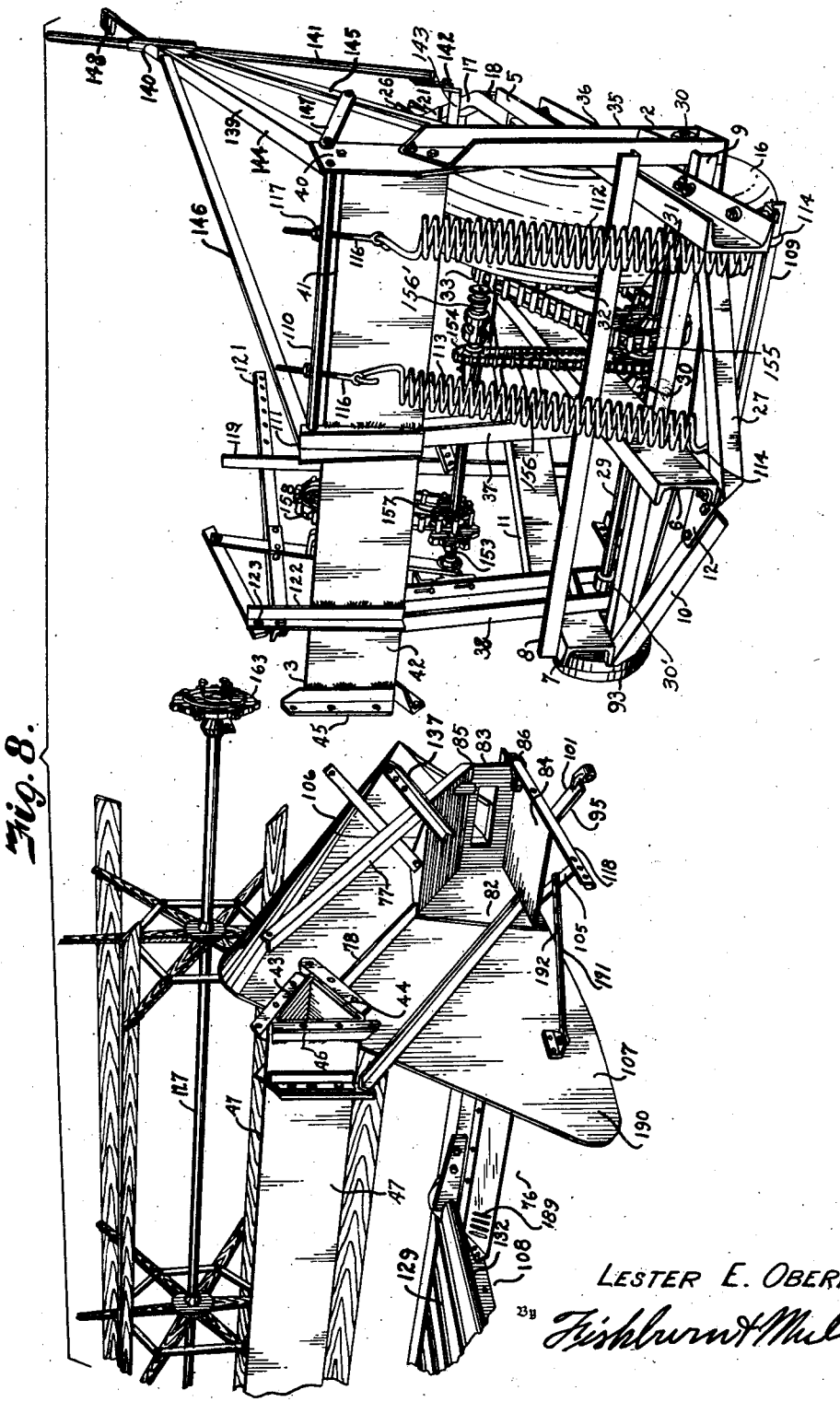
Fig. 8 is an enlarged perspective view of the main frame and harvester section of the machine shown in disconnected spaced relation.

The rear ends of the longitudinal sills 5 and 6 are also connected by a diagonal member 27 as best shown in Figs. 1 and 8.

The main wheel 16 is carried in the wheel pocket 15 on the end of an axle 28 that is connected at one end with the diagonal sill 11 and to the longitudinal sill 6 as shown in Fig. 1. The end of the axle 28 terminates in a suitable spindle on which the main wheel 16 is rotatable. It is obvious that the main frame 2 is supported by the main wheel 16 and stabilized thereon in a fore and aft direction by connection with the draft vehicle.

Extending transversely below the longitudinal sills 5, 6 and 7 is a pivot shaft 29 which is suitably mounted in bearings 30 and 30' that are attached to the undersides of the respective sills. The shaft 29 carries a sprocket 31 that is fixed thereto and which is driven by a sprocket 32 through a chain 33. The sprocket 32 is attached to the main wheel so that it is rotated thereby to rotate the shaft 29 as later described. The chain is tensioned about the sprocket 32 by an idler sprocket 34 engaging the underrun of the chain and which is secured in position by a bracket attached to the main sill 6.

The harvester section is carried by a pivot frame 35 adapted to rock on the shaft 29. The pivot frame includes post members 36, 37, and 38 and have their lower ends pivoted on the shaft and connected below the main frame by a transverse plate 39 located a sufficient distance below the main frame to allow free pivoting of the pivot frame. The upper end of the post 36 is connected by a gusset plate 40 with the outer end of a main spine section 41 which extends transversely of the upper ends of the post 37 and 38 and which is suitably connected thereto.

The spine section 41 comprises an inverted V-shaped member having a substantially vertical rear leg 42 and a forwardly and downwardly inclined front leg 43. The lower edges of the respective legs are flanged inwardly as indicated at 42' and 43' to connect with a plate 44 to form a substantially hollow spine member of triangular cross section as best shown in Figs. 4 and 8. The inner end of the spine section 41 projects slightly beyond the inner side of the post member 38 and the legs and plate thereof are provided with angles 45 to connect similar angles 46 of a continuing spine section 47 by means of bolts 48 (see Fig. 1). The section 47 conforms in construction and cross sectional shape to the spine section 41 and extends the full width of the harvester section. Spaced from the post 38 is a post 49 which cooperates with an end post 50 and intermediate posts 51 in carrying a draper frame 52 comprising front and rear angle members 53 and 54. The rear angle member 54 extends from the post 49 to the endmost post 50 and the space therebetween is closed by sheet metal to provide a back or windboard 55 extending along the length of the draper 56 later described.

The posts 49 and 51 are preferably of a truss-like structure in that they include vertical members 57 fixed to the rear leg of the spine and which have gusset plates 58 connecting rearwardly and downwardly extending brace members 59 with the upturned ends 60 of longitudinal members 61, the lower ends of the brace members 59 being connected with the ends 60 by gusset plates 62. The lower ends of the vertical members 57 are connected with the longitudinal members 61 by similar gusset plates 63. The longitudinal members 61 are connected with the transverse members 53 and 54 to carry a sheet metal bottom 64. The outer end of the harvester frame is closed by an end wall 65 which includes a grain divider 66.

Figure 3:
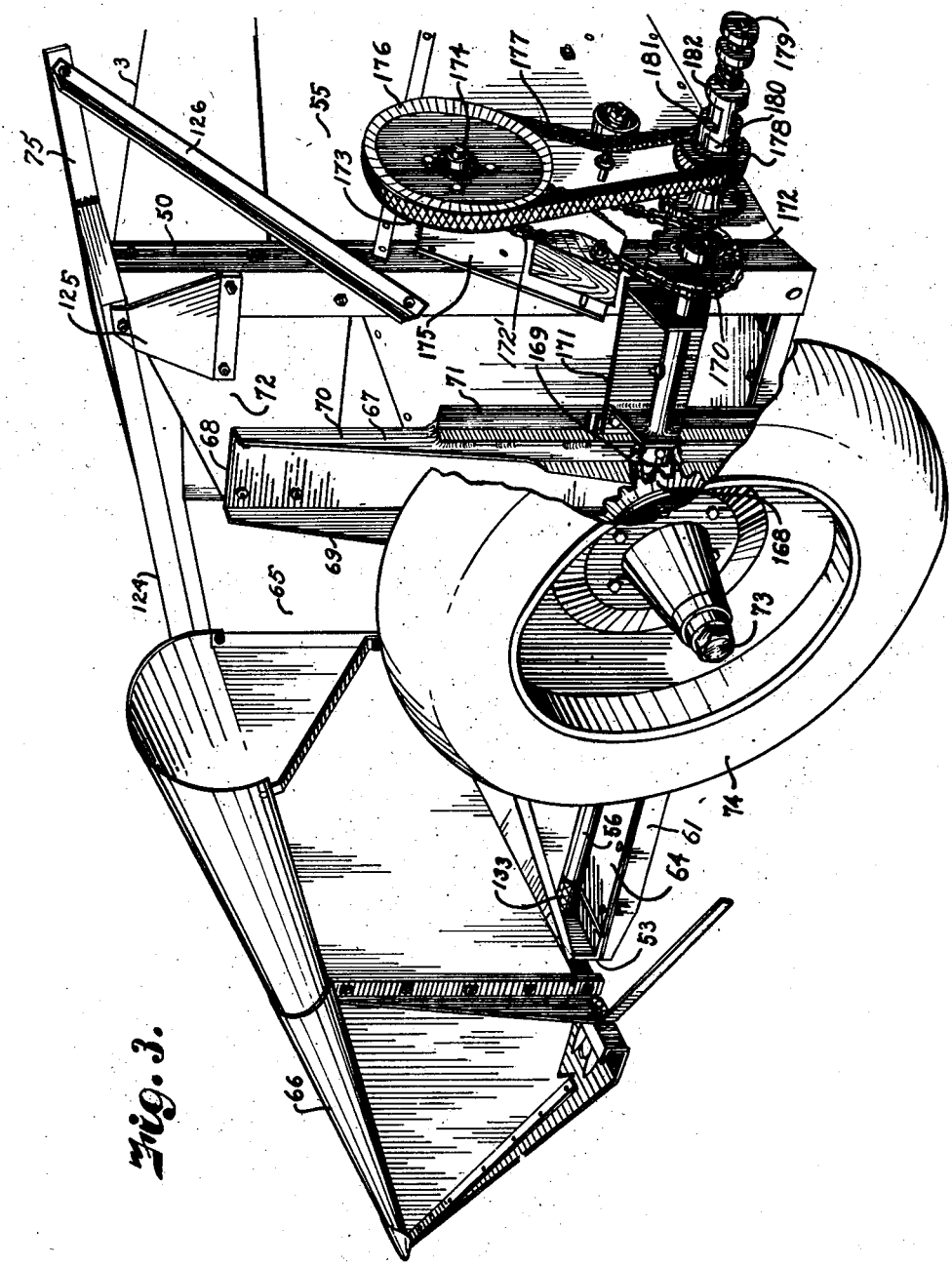
Fig. 3 is an enlarged perspective view of the opposite side of the machine, part of the grain wheel being broken away to better illustrate the draper driving mechanism.

Fixed to the harvester frame on the outer side of the end wall 65 is a wheel supporting post 67 of channel shape, the web 68 thereof being attached to the end wall with the flanges 69 and 70 extending outwardly as best shown in Fig. 3. The attachment of the wheel supporting post 67 is reinforced with respect to the frame by side angles 71 and also by a plate 72 that connects with the upper end of the endmost post 50. Carried by the wheel post and extending laterally therefrom in alignment with the pivot shaft 29 is a spindle 73 that mounts a grain wheel 74 which carries the outer end of the harvester section.

The front portion of the harvester frame is connected to the post 50 adjacent the wall 65 by a tension member 75. Cooperating with the member 75 in alignment with the respective sides of a grain discharge opening 76 are similar tension members 77 and 78 having their upper ends secured to the front leg of the spine sections by angles 79 and 80. The forward ends are interconnected by the top plate 81 of a housing 82 which includes a front plate 83 and a rearwardly extending bottom plate 84. The plates 81 and 82 have vertically aligned bearings 85 and 86 for mounting the shaft 87 of a bell crank 88 which has one arm 89 connected with a drive rod 90 of a sickle bar 91 and the other arm of the bell crank is connected by a pitman 92 with an eccentric 93 mounted on the inner end of the pivot shaft 29. The sickle bar is reciprocable in a guard 94 that extends along the front member 53.

The triangular spine and framework thus described provides a substantially rigid structure in resisting torque strains, but to assist in maintaining lateral alignment of the harvester section, the main and harvester frames are connected by a main diagonal brace 95 which is shown in detail in Fig. 6. The brace 95 includes one section 99 attached to the plate 39 below the post 37 and the forward end of the section 95 is connected by a joint 100 with a section 101 having its forward end connected with the bottom plate 84. The joint 100 is best illustrated in Fig. 7 and includes a tapered socket member 102 on the section 101 and a tapered lug 103 on the section 99. The lug is drawn into the socket by a drawbolt 104.

The frames are also connected by a supplemental diagonal brace 105 which connects the inner end of the plate 39 with the outer side of the bottom plate 84. The end of the harvester section adjacent the housing 82 is connected with a grain divider 106 which is also secured to the tension member 78 shown in Fig. 2. The rear edge 107 of the grain divider terminates adjacent the forward side of the draper in cooperation with the backboard 55 to form a grain opening 108.

The rear ends of the longitudinal sills 5 and 6 mount a cross shaft 109 which cooperates with a similar cross shaft 110 connecting the gusset plate 40 with a bracket 111 attached to the rear leg of the spine to interconnect balancing springs 112 and 113. The lower ends of the springs are provided with hooks 114 which are engaged over the cross rod 109 and their upper ends are connected with eye bolts 116 that are adjustably positioned within openings of the rod 110 by means of adjusting nuts 117 to adjust action of springs and thereby counterbalance the harvester frame on the axis of the pivot shaft and axle of the grain wheel. Fixed to the forward portion of a longitudinal member 118 is a post 119 having a plurality of openings 120 for adjustably positioning a reel supporting arm 121, the rear end of which is pivotally mounted on an angle bracket 122 that is attached to the rear leg of the spine by a pivot bolt 123. The opposite end of the harvester frame carries a similar arm 124 which is pivotally mounted on the post 50 and a plate-like bracket 125. The rear end of the arm 124 projects beyond the backboard of the harvester and is connected with the post 50 by a brace 126. Mounted on the front end of the arms 121 and 124 is a reel shaft 127 carrying a reel 128 that is rotatable over the sickle to carry the grain into contact with the sickle and deliver the grain onto the draper 56.

The draper 56 includes a belt 129 having an upper run 130 adapted to move toward the discharge opening for carrying the grain thereto and a lower run 131 movable over the pan bottom 64. The ends of the draper are supported on rollers 132 and 133, the ends of which are suitably journalled within the bearings 134 carried by the front and rear members 53 and 54 of the draper frame. The gusset 40 is also connected with the top 80 of the housing 81 by a diagonal brace 135 which includes sections 136 and 137 removably connected together by bolts 138.

A lever arm 139 is provided to raise and lower the harvester section (see Fig. 8). This arm includes a sleeve member 140 slidably mounted on a tubular guide 141 having its lower end pivoted as at 142 to the end of a cross member 143 extending transversely of the converging portion of the hitch frame. Connected with the sleeve member 140 are upper and lower diverging arms 144 and 145 that are braced laterally from the bracket 111 by a brace 146. The arm 145 is also connected with the gusset plate 40 by a brace 147 so that the lever arm 139 extends rigidly from the pivotal section of the main frame and terminates in a lever 148 that is attached to the sleeve member 140 and which extends into convenient reach of the operator of the tractor vehicle. The lever 148 also preferably includes a suitable latch mechanism (not shown) to retain the sleeve in an adjusted position on the guide 141. Such latch mechanisms are well known and forms no part of the present invention.

The operating parts of the machine are actuated from the pivot shaft 29 as now to be described: Extending transversely of the pivotal section of the main frame and mounted in suitable bearings 152 on the posts 37 and 38 is a countershaft 153 carrying a sprocket 154 in alignment with sprocket 155 (Fig. 8) on the pivot shaft and operating over the respective sprocket is a chain 156 to drive the countershaft 153, the sprocket 154 being preferably connected with the countershaft through a clutch 156' which connects the sprocket with the shaft when the main wheel is moved in a forward direction but which effects disconnection upon backing of the machine or back turning of the main wheel.

Also mounted on the countershaft 153 is a sprocket 157 which drives a sprocket 158 through a chain 159. The sprocket 158 is mounted on a stub shaft 158a that is carried by an arm 160 which is pivoted on the countershaft and has its upper end connected with a tie link 161 with the angle bracket 122. The stub shaft has a bracket portion 158b which bears against the arm 160 when a nut 158c is tightened on a reduced threaded end 158d of the stub shaft 158a, suitable washers 158e having been inserted between the nut 158c and the arm 160. Connected in driving relation with the sprocket 158 is a sprocket 162 (Fig. 1) that registers with a sprocket 163 on the end of the reel shaft 127 and which is actuated from the sprocket 162 by a chain 164 as best shown in Figs. 2 and 4. The sprocket 163 is frictionally retained between a driving plate 163a and a ring 163b. The parts are retained in assembly by bolts 163c that extend through slots 163d in the plate 163a, through the opening 163f in the sprocket, and through apertures 163g in the ring 163b. Mounted on the bolts are springs 163h which engage between the ring 163b and washers 163i that are retained on the ends of the bolts by nuts 163j. The countershaft also has a sprocket 165 that registers with the sprocket 166 that is connected with the eccentric 93, the eccentric sprocket being actuated from the sprocket 165 by a chain 167 to actuate the sickle bar.

The draper is actuated from the grain wheel (Fig. 3). The grain wheel is provided with a bevel gear 168 which meshes with a pinion gear 169 on a shaft 170, the shaft 170 being journalled in a bearing bracket 171 carried between the angle 71 and post 50. The rear end of the shaft carries a sprocket 172 that drives a chain 172' operating over a sprocket 173 on a stub shaft 174. The stub shaft 174 is mounted on a plate 175 that is carried by the post 50. Fixed in driving relation with the sprocket 173 is a pulley 176 having a grooved periphery mounting an endless belt 177 which operates over a pulley 178 on an extension of the draper shaft 179 of the draper roller. The pulley is loosely mounted on the draper shaft and has a clutch face 180 meshing with a similar clutch face 181 on the spring-pressed collar 182 which is slidably keyed to the shaft. When the grain wheel is operating in a forward direction the clutch face of the clutch collar engages the pulley to drive the draper but when the grain wheel moves in reverse direction as when turning a corner, the reverse movement of the pulley 181 moves the clutch collar out of clutching engagement therewith to stop actuation of the draper until the grain wheel again moves in a forward direction.

The roller 132 for the opposite end of the draper is adjustably mounted on a rod 183 slidably mountd in the gusset plate 63 and adjustably positioned in a bracket 184 that projects from the rear of the back wall of the harvester pan. The end of the rod is threaded and retained in adjusted position by nuts 184' which engage against the bracket 184. The opposite end of the roller is carried by a plate 185 that is adjustably attached to the front transverse member 52 by bolts 186 that extend through the slots 187 in the plate so that upon loosening of the bolts the plate may be slid along the angle member to align the roller 132 after which the bolts 186 are retightened.

In order to prevent the stubble from interfering with discharge of the grain from off the delivery end of the conveyor, the front transverse member carries a stubble guard 188 that inclines downwardly from the front transverse member and prevents the grain cut by the portion of the sickle immediately in front of the discharge opening from falling onto the stubble and interfering with discharge of the cut grain by the draper. In order to assist discharge of the grain from the stubble guard, the ends of the stubble guard may be provided with rearwardly converging slots 189 through which the bent over end of the stubble rises as the machine is moved along the field and effect discharge of any cut grain that tends to lodge on the stubble guard.

The width of the windrow may be adjusted by positioning the rear portion 190' of a flexible wing 190 to and from the discharge end of the draper. The wing 190 consists of a rearward and downward extension of the divider 106. This adjustment is effected by a link 191 having a plurality of apertures 192 for passing a fastening device by which the end of the link is connected with the brace 105 (see Figs. 1 and 8). It is obvious that by inserting the fastening device in the proper aperture 92 the wing 190 may be set closer to the roller 132 or be moved therefrom to vary the space between the roller 132 and the rear edge of the wing.

In using the machine constructed and assembled as described, the clevis 26 is connected with the draw bar of the tractor (not shown). The weight of the machine is then carried on the main and grain wheels and stabilized by connection with the tractor. When the machine moves over uneven ground in following the tractor the frames thereof pivot on the axles of the main and grain wheels. The tongue 22 may be adjusted for the side draft effected by the grain wheel by positioning the bolt 24 in the proper opening 25 to cause the machine to move in a straight-away direction with the sickle extending at right angles to the path of travel.

When the machine is being drawn by the tractor turning of the main wheel operates the pivot shaft 29 to drive the countershaft 153 through the chain 155, sprocket 154 and clutch 156'. Rotation of the countershaft drives the sickle through the sprocket 165, chain 167, sprocket 166, eccentric 93, pitman 92, bell crank 88 and drive rod 90. The countershaft also drives the reel 128 through the sprocket 157, chain 159, sprocket 158, sprocket 162, chain 164, and sprocket 163.

When the machine moving in a forward direction, the draper is being operated by the grain wheel through the gears 168 and 169, shaft 170, sprocket 172, chain 172', pulley 176, belt 177, pulley 178, clutch collar 182, and draper shaft 179. The upper run of the draper is therefore moving along the rear of the sickle toward the discharge end thereof.

The harvester section is tilted on the axis of the shaft 35 and the grain wheel 74 to effect raising and lowering of the front of the harvester section so that the sickle bar is at the proper cutting height. This is effected by the operator of the tractor who grasps the handle 148 and shifts the lever 139 on the post 141 to rock the pivot and harvester frames on the axis of the pivot shaft 29 and grain wheel. It is thus obvious that the harvester pivots independently of the axis of the main wheel. In this way main wheel is located in a position so that the major weight is balanced thereon to enhance the traction of the wheel and provide positive and effective drive for the reel and sickle.

The springs 112 substantially balance the harvester section on its pivotal axis so that little effort is needed on the part of the tractor operator to adjust the cutting height.

With the machine in operation, the reel moves the grain into contact with the sickle and lays the cut grain over on the draper whereby the cut grain is carried toward and discharged through the opening 76 onto the ground progressively with movement of the machine to form a windrow. The grain cut by the sickle which is in registry with the windrow topples over the stubble guard. The stubble guard is kept clear of cut grain by the action of the stubble which moves through the slots 189, the stubble racking the grain off of the guard. This is an important feature as it prevents grain from bunching upon the guard and returning under the draper to clog the drive roller.

Upon reaching the opposite side of the field, the operator guides the tractor to move along that side of the field and so on around the field. During turning of the corners the grain wheel being on the inside of the turn, stops its forward movement and rotates in a reverse direction. This action stops movement of the draper so that the cut grain then on the draper and that being cut at the turn is carried on the draper without discharge until the machine is again moving in a straight-away direction whereupon the draper again starts operation and deposits the grain in a windrow extending along that side of the field. Automatic control of the draper at the corners, not only provides clearly defined windrows but the stoppage spaces the ends of the windrows to provide clear pathways diagonally of the field. Thus, the central portions of the field may be entered without driving the trucks or wagons over the windrows.

The spine and cantilever support of the draper and harvester frame thereby provides an extremely rigid and light weight structure and maintains a level position of the sickle. The side draft resulting from the lateral position of the harvester section is readily compensated for by adjustment of the draft tongue and any strains resulting therefrom are taken care of by provision of the main diagonals 135 and 105.

The harvester unit is readily disconnected from the main and pivot frame upon removal of the bolts 48, which connect the spine sections, the bolts 138 which connect the sections 136 and 137 of the main diagonal 135, the bolts which connect the longitudinal member 118 with main frame, and the bolt 104 which connects the sections of the brace 95. It is also necessary to disconnect the brace 105, angle member 77, reel shaft bearing on the arm 121 and the pitman 92.

From the foregoing it is obvious that the windrower as illustrated and described provides a strong, light-weight structure having a minimum draft and which has the weight centered on the main wheel to effect a positive drive for the reel and sickle. It is also obvious that the spine structure provides a strong rigid support for the harvester unit and permits pivoting thereof on the axis of the pivot shaft and the grain wheel. The arrangement of the drives also eliminates automatic chain tighteners to compensate for pivoting of the main frame on the main wheel and adjustment of the harvester frame relatively to the main frame.

What I claim and desire to secure by Letters Patent is:

1. A machine of the character described including a main frame, a main wheel carrying the main frame, a tongue connected with the main frame for connection with a draft vehicle, a countershaft extending transversely of the main frame at the rear of the main wheel, a pivot frame including posts having lower ends pivotally supported on the countershaft and having upwardly extending opposite ends, a spine member connecting the upper ends of the posts, a spine member forming a continuation of the spine member of the pivot frame, post members having lower ends depending from the last-named spine member, a draper frame having a rear transverse member connected with lower ends of said depending post members and having a forward transverse member, tension members connecting said last-named spine member with the forward transverse member, arms connecting lower ends of the depending posts with the forward transverse member, a grain wheel supporting the draper frame remote from the main wheel, and diagonal members connecting the forward transverse member of the draper frame with the pivot frame and cooperating with said last-named spine member to space the draper frame from the main frame and provide a discharge opening therebetween through which a windrow is adapted to be deposited by said draper.

2. A machine of the character described including a main frame, a main wheel carrying the main frame, a tongue connected with the main frame for connection with a draft vehicle, a countershaft extending transversely of the main frame rearwardly of the main wheel, a pivot frame including posts having lower ends pivotally supported on the countershaft and having upper ends, a spine member connecting the upper ends of the posts, a spine member forming a continuation of the spine member of the pivot frame, post members having lower ends depending from the last-named spine member, arms cantilevered from the lower ends of said depending posts, front and rear transverse members carried by said arms, tension members connecting the last-named spine member with the forward transverse members, and a grain wheel supporting the last-named spine member remote from the first named spine member.

3. In a machine of the character described which includes a harvester unit and a main frame having substantially balanced support upon a main wheel and stabilized in a fore and aft direction by a draft connection with the draft vehicle to which the machine is adapted to be connected, means for pivotally supporting the harvester unit relatively to the main frame including, a pivot frame comprising a spine member extending transversely of the main frame and along the rear of the harvester unit rearwardly of the main wheel, spine supports connected with the spine member at the end thereof which extends transversely of the main frame, means pivotally connecting said spine supports with the main frame at the rear of the main wheel for pivotal movement about a transverse axis independently of the pivotal axis on the main frame on said main wheel, a grain wheel support carried at the end thereof remote from the main frame, a grain wheel means journaling the grain wheel on the harvester unit in axial alignment with the pivotal axis of said spine supports, means carrying the harvester unit from said spine member, and counterbalance means connecting the spine member with the rear of the main frame to balance the harvester unit on said frame.

4. In a machine of the character described which includes a harvester unit and a main frame having substantially balanced support upon a main wheel and stabilized in a fore and aft direction by a draft connection with the draft vehicle to which the machine is adapted to be connected, a frame for pivotally supporting the harvester unit relatively to the main frame including, a spine member extending transversely of the main frame and along the rear of the harvester unit and rearwardly of the main wheel, spine supports connected with the spine member at the end thereof which extends transversely of the main frame, a countershaft connecting said spine supports with the main frame at the rear of the main wheel for pivotal movement about a transverse axis independently of the pivotal axis on the main frame on said main wheel, a grain wheel support carried by the end of the spine member remote from the main frame, a grain wheel means journaling the grain wheel on the harvester unit in alignment with the countershaft, a driving connection between the main wheel and the countershaft, means on the countershaft for driving parts of the harvester unit, means carrying the harvester unit from said spine member, and counterbalance means connecting the spine member with the rear of the main frame to balance the harvester unit on said main frame.

5. In a machine of the character described which includes a harvester unit and a main frame having substantially balanced support upon a main wheel and stabilized in a fore and aft direction by a draft connection with the draft vehicle to which the machine is adapted to be connected, means for pivotally supporting the harvester unit relatively to the main frame including, a pivot frame comprising a spine member extending transversely of the main frame and along the rear of the harvester unit rearwardly of the main wheel, spine supports connected with the spine member at the end thereof which extends transversely of the main frame, means pivotally connecting said spine supports with the main frame at the rear of the main wheel for pivotal movement about a transverse axis independently of the pivotal axis on the main frame on said main wheel, a grain wheel support carried by the end of the spine member remote from the main frame, a grain wheel journaled on the grain wheel support in axial alignment with pivotal axis of said supports for the spine member, means carrying the harvester unit from said spine member, a diagonal member connecting the spine member with the harvester unit, and counterbalance means connecting the spine member with the rear of the main frame to balance the harvester unit on said main frame.

6. In a machine of the character described which includes a harvester unit and a main frame having substantially balanced support upon a main wheel and stabilized in a fore and aft direction by a draft connection with the draft vehicle to which the machine is adapted to be connected, means for pivotally supporting the harvester unit relatively to the main frame including, a pivot frame including a spine member extending transversely of the main frame rearwardly of the main wheel, a spine member having removable connection with the first named spine member for forming continuation of said spine member along the rear of the harvester unit, spine supports connected with the spine member, means pivotally connecting said spine supports with the main frame at the rear of the main wheel for pivotal movement about a transverse axis independently of the pivotal axis on the main frame on said main wheel, said removable spine member having an outer end, a grain wheel support carried by the outer end of said removable spine member, a grain wheel journaled on the grain wheel support in coaxial alignment with pivotal axis of said spine supports, means carried by the removable spine member for supporting the harvester unit, tension members extending from the said spine member to the harvester unit, and counterbalance means connecting the first named spine member with the rear of the main frame to balance the harvester unit on said main frame.

7. A windrower adapted to be pulled by a tractor, said windrower including a longitudinally extending main frame, a main wheel carrying the main frame for pivotal balance about a transverse axis on which the main wheel rotates, said main frame having a rear portion projecting rearwardly from the main wheel for support of a harvester section and a forwardly extending portion adapted for connection with a tractor, a pivotal frame extending transversely of the main frame and having a lower portion pivotally connected with said rear portion of the main frame and having an upper portion extending upwardly from the pivotal connection with the main frame, a harvester section having a spine member forming a lateral continuation of the upper portion of the pivotal frame, a grain wheel, means connected with the end of the spine member opposite the pivotal frame for mounting the grain wheel for rotation about an axis in aligning registry with the pivotal axis of the pivotal frame and to form a support cooperating with the main frame in providing a transverse axis on which the harvester section is raised and lowered according to the height of a crop to be windrowed, and a counter balance spring connecting the upper portion of the pivotal frame with the rear portion of the main frame.

8. A windrower adapted to be pulled by a tractor, said windrower including a longitudinally extending main frame, a main wheel carrying the main frame for pivotal balance about a transverse axis on which the main wheel rotates, said main frame having a rear portion projecting rearwardly from the main wheel for support of a harvester section and a forwardly extending portion adapted for connection with a tractor, a counter shaft journalled transversely of said rear portion of the main frame, a pivotal frame extending transversely of the main frame and having a lower portion pivotally connected with said rear portion of the main frame coaxially with the axis of the counter shaft and having an upper portion extending upwardly from the pivotal connection with the main frame, a driving connection between the main wheel and the counter shaft, a harvester section having a spine member forming a lateral continuation of the upper portion of the pivotal frame, a grain wheel, and means connected with the end of the spine member opposite the pivotal frame for mounting the grain wheel for rotation about an axis in aligning registry with the pivotal axis of the pivotal frame and to form a support cooperating with the main frame in providing a transverse axis on which the harvester section is adapted to be raised and lowered in accordance with the height of a crop to be windrowed, driving connections between the counter shaft and the harvester section, and a counter balance spring connecting the upper portion of the pivotal frame with the rear portion of the main frame.

LESTER E. OBERHOLTZ.

References Cited in the file of this patent

UNITED STATES PATENTS

| Number | Name | Date |
|---|---|---|
| 1,199,678 | Elliason | Sept. 26, 1916 |
| 1,847,288 | Worthington | Mar. 1, 1932 |
| 1,974,410 | Caughey | Sept. 25, 1934 |
| 2,281,059 | Anderson et al. | Apr. 28, 1942 |
| 2,354,962 | Oehler et al. | Aug. 1, 1944 |
| 2,395,672 | Kranick et al. | Feb. 26, 1946 |
| 2,532,164 | Hansen et al. | Nov. 28, 1950 |